United States Patent
Zou

(10) Patent No.: US 10,213,963 B2
(45) Date of Patent: Feb. 26, 2019

(54) METHOD OF ADHERING AND CONVEYOR BELT

(71) Applicant: The Yokohama Rubber Co., LTD., Minato-ku, Tokyo (JP)

(72) Inventor: Deqing Zou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/989,021

(22) Filed: May 24, 2018

(65) Prior Publication Data

US 2018/0264748 A1 Sep. 20, 2018

Related U.S. Application Data

(63) Continuation of application No. 15/505,582, filed as application No. PCT/JP2015/073623 on Aug. 21, 2015, now Pat. No. 10,005,232.

(30) Foreign Application Priority Data

Aug. 21, 2014 (JP) ................. 2014-168786

(51) Int. Cl.

| | |
|---|---|
| *B29C 65/00* | (2006.01) |
| *B65G 15/32* | (2006.01) |
| *C09J 5/00* | (2006.01) |
| *C09J 123/08* | (2006.01) |
| *B29C 65/48* | (2006.01) |
| *C09J 123/16* | (2006.01) |
| *B65G 15/38* | (2006.01) |
| *C08J 5/12* | (2006.01) |
| *F16G 3/10* | (2006.01) |
| *B29K 507/04* | (2006.01) |
| *B29K 623/00* | (2006.01) |
| *B29L 31/00* | (2006.01) |
| *C08K 3/04* | (2006.01) |
| *C08K 5/14* | (2006.01) |
| *B29K 105/00* | (2006.01) |

(52) U.S. Cl.
CPC ...... *B29C 66/4324* (2013.01); *B29C 65/4835* (2013.01); *B65G 15/32* (2013.01); *B65G 15/38* (2013.01); *C08J 5/128* (2013.01); *C09J 5/00* (2013.01); *C09J 123/08* (2013.01); *C09J 123/0815* (2013.01); *C09J 123/16* (2013.01); *F16G 3/10* (2013.01); *B29C 66/1122* (2013.01); *B29C 66/43* (2013.01); *B29C 66/71* (2013.01); *B29K 2105/0008* (2013.01); *B29K 2105/0026* (2013.01); *B29K 2105/0032* (2013.01); *B29K 2105/0038* (2013.01); *B29K 2105/0044* (2013.01); *B29K 2507/04* (2013.01); *B29K 2623/08* (2013.01); *B29K 2995/0016* (2013.01); *B29L 2031/7092* (2013.01); *B65G 2812/02198* (2013.01); *C08J 2323/08* (2013.01); *C08J 2423/08* (2013.01); *C08K 3/04* (2013.01); *C08K 5/14* (2013.01); *C09J 2205/102* (2013.01); *C09J 2205/114* (2013.01); *C09J 2423/04* (2013.01); *C09J 2423/16* (2013.01)

(58) Field of Classification Search
CPC .................................................. B29C 66/4324
See application file for complete search history.

(56) References Cited

U.S. PATENT DOCUMENTS 6,569,936 B1 * 5/2003 Kawasaki ................ C08K 3/04
524/474

\* cited by examiner

*Primary Examiner* — Daniel H Lee
(74) *Attorney, Agent, or Firm* — Thorpe North & Western

(57) ABSTRACT

A conveyor belt obtained by bonding together conveyor belts to be adhered using an adhesive rubber is provided. The conveyor belts to be adhered include a rubber composition containing an ethylene-α-olefin copolymer, an organic peroxide (X1), and carbon black (Y1), the organic peroxide (X1) being contained in an amount of from 0.011 to 0.020 molar equivalents relative to the ethylene-α-olefin copolymer in the conveyor belts to be adhered. The adhesive rubber includes a rubber composition containing an ethylene-α-olefin copolymer, an organic peroxide (X2), and carbon black (Y2), the organic peroxide (X2) being contained in an amount of from 0.017 to 0.022 molar equivalents relative to the ethylene-α-olefin copolymer in the adhesive rubber. A content ratio (X2/X1) of the organic peroxide (X2) to the organic peroxide (X1) is from 1.20 to 2.00.

2 Claims, No Drawings

METHOD OF ADHERING AND CONVEYOR BELT

RELATED APPLICATIONS

This application is a continuation of U.S. patent application Ser. No. 15/505,582 filed on Feb. 21, 2017, which is the national stage of International Patent Application No. PCT/JP2015/073623 filed on Aug. 21, 2015, which claims the benefit of Japan Patent Application No. 2014-168786, filed on Aug. 21, 2014.

TECHNICAL FIELD

The present technology relates to a method of adhering and a conveyor belt.

BACKGROUND ART

For many large-scale rubber products including conveyor belts, rubber crawlers, and large-scale gaskets made of rubber, a procedure of disposing an unvulcanized rubber for adhesion (also referred to as "tie rubber") at an adhesion interface upon adhesion (bonding) of vulcanized rubber components to be adhered or a vulcanized rubber component to an unvulcanized rubber component has been conventionally used.

For example, in Japanese Unexamined Patent Application Publication No. 2008-248003A, the applicant of the present technology has proposed "a method of adhering together rubbers to be adhered including a rubber composition containing a diene-based rubber and a sulfur-containing organic compound, using an unvulcanized rubber for adhesion including a rubber composition containing a diene-based rubber and a sulfur-containing organic compound at an adhesive interface, wherein a total sulfur amount X of the rubber to be adhered is from 0.16 to 0.54 parts by mass relative to 100 parts by mass of the diene-based rubber in the rubber to be adhered, a total sulfur amount Y of the rubber for adhesion is from 0.20 to 1.00 parts by mass relative to 100 parts by mass of the diene-based rubber in the rubber for adhesion, and a ratio (Y/X) of the total sulfur amount Y to the total sulfur amount X is from 1.25 to 2.50".

However, in the method of adhering described in Japanese Unexamined Patent Application Publication No. 2008-248003A, a vulcanization (crosslinking) system using an organic peroxide such as dicumyl peroxide is not considered since an object thereof is to "provide an adhesion method capable of favorably adhering together rubber products that each contain a sulfur-containing organic compound such as morpholine disulfide and have excellent heat resistance." For example, this shows that the adhesion method cannot be applied to adhesion of a heat-resistant conveyor belt including a cover rubber containing of a rubber composition containing an ethylene-α-olefin copolymer and the like.

SUMMARY

The present technology provides a method of adhering capable of favorably adhering together rubber products that each contain an organic peroxide such as dicumyl peroxide and have excellent heat resistance, and a conveyor belt produced using the method of adhering.

The present inventor has intensively studied, and as a result, found that when the content of an organic peroxide in a rubber for adhesion is increased so as to be larger than the content of an organic peroxide in a rubber to be adhered by a particular small amount in a system containing an ethylene-α-olefin copolymer, even rubber products that each contain an organic peroxide such as dicumyl peroxide and have excellent heat resistance can be favorably adhered to each other. Thus, the present technology has been completed.

[1] A method of adhering together rubbers to be adhered including a rubber composition containing an ethylene-α-olefin copolymer, an organic peroxide (X1), and carbon black (Y1), using a rubber for adhesion including a rubber composition containing an ethylene-α-olefin copolymer, an organic peroxide (X2), and carbon black (Y2) at an adhesive interface, wherein a content of the organic peroxide (X1) in the rubber to be adhered is from 0.011 to 0.020 molar equivalents relative to the ethylene-α-olefin copolymer in the rubber to be adhered, a content of the organic peroxide (X2) in the rubber for adhesion is from 0.017 to 0.022 molar equivalents relative to the ethylene-α-olefin copolymer in the rubber for adhesion, and a content ratio (X2/X1) of the organic peroxide (X2) to the organic peroxide (X1) is from 1.20 to 2.00.

[2] The method of adhering according to [1], wherein a content of the carbon black (Y1) in the rubber to be adhered is from 40 to 60 parts by mass relative to 100 parts by mass of the ethylene-α-olefin copolymer in the rubber to be adhered, a content of the carbon black (Y2) in the rubber for adhesion is from 30 to 50 parts by mass relative to 100 parts by mass of the ethylene-α-olefin copolymer in the rubber for adhesion, and a difference (Y1−Y2) in the content between the carbon black (Y1) and the carbon black (Y2) is from 0 to 10 parts by mass.

[3] The adhesion method according to [1] or [2], wherein the method is used in bonding together conveyor belts.

[4] A conveyor belt obtained by adhesion through the method of adhering described in [3].

As described below, the present technology can provide a method of adhering capable of favorably adhering rubber products together that each contain an organic peroxide such as dicumyl peroxide and have excellent heat resistance, and a conveyor belt produced using the method of adhering.

DETAILED DESCRIPTION

The method of adhering of the present technology and the conveyor belt of the present technology will be described below.

Note that, in the present specification, numerical ranges indicated using "(from) . . . to . . . " include the former number as the lower limit value and the later number as the upper limit value.

Method of Adhering

The method of adhering of the present technology is a method of adhering together rubbers to be adhered including a rubber composition containing an ethylene-α-olefin copolymer, an organic peroxide (X1), and carbon black (Y1), using a rubber for adhesion including a rubber composition containing an ethylene-α-olefin copolymer, an organic peroxide (X2), and carbon black (Y2) at an adhesive interface, wherein a content of the organic peroxide (X1) in the rubber to be adhered is from 0.011 to 0.020 molar equivalents relative to the ethylene-α-olefin copolymer in the rubber to be adhered, a content of the organic peroxide (X2) in the rubber for adhesion is from 0.017 to 0.022 molar equivalents relative to the ethylene-α-olefin copolymer in the rubber for adhesion, and a content ratio (X2/X1) of the organic peroxide (X2) to the organic peroxide (X1) is from 1.20 to 2.00.

Herein, the content ratio (X2/X1) is a ratio of the molar equivalent of the organic peroxide (X2) relative to the ethylene-α-olefin copolymer in the rubber for adhesion to the molar equivalent of the organic peroxide (X1) relative to the ethylene-α-olefin copolymer in the rubber to be adhered.

In the present technology, since the organic peroxide (X1) in the rubber to be adhered and the organic peroxide (X2) in the rubber for adhesion satisfy the contents and the content ratio described above, rubber products can be favorably adhered to each other.

Although the reason is not clear in detail, it is assumed to be as follows.

Specifically, this is considered because a crosslinking reaction is likely to be promoted between the rubber to be adhered and the rubber for adhesion by increasing the concentration of radicals produced due to the organic peroxide at the adhesive interface and causing a concentration gradient between the concentration of the radicals and the concentration of radicals in the rubber to be adhered itself.

In the present technology, the abrasion resistance of the rubber to be adhered is maintained and the adhesion properties are improved. Therefore, it is preferable that the content of the carbon black (Y1) in the rubber to be adhered be from 40 to 60 parts by mass relative to 100 parts by mass of the ethylene-α-olefin copolymer in the rubber to be adhered, the content of the carbon black (Y2) in the rubber for adhesion be from 30 to 50 parts by mass relative to 100 parts by mass of the ethylene-α-olefin copolymer in the rubber for adhesion, and the difference (Y1−Y2) in the content between the carbon black (Y1) and the carbon black (Y2) be from 0 to 10 parts by mass.

Herein the difference (Y1−Y2) in the content between the carbon black (Y1) and the carbon black (Y2) is a difference between the content expressed in parts by mass of the carbon black (Y1) relative to 100 parts by mass of the ethylene-α-olefin copolymer in the rubber to be adhered and that of the carbon black (Y2) relative to 100 parts by mass of the ethylene-α-olefin copolymer in the rubber for adhesion.

Next, the rubber to be adhered, the rubber for adhesion, and a specific mode of adhering them to each other will be described.

Rubber to be Adhered

In the present technology, the rubber to be adhered is not particularly limited as long as it includes the rubber composition containing the ethylene-α-olefin copolymer described below, the organic peroxide (X1), and the carbon black (Y1). The rubber to be adhered may be an unvulcanized rubber (hereinafter referred to as "unvulcanized rubber component") or a vulcanized rubber (hereinafter referred to as "vulcanized rubber component"), and is preferably an unvulcanized rubber component.

Further, the rubbers to be adhered include not only vulcanized rubber components or unvulcanized rubber components, but also a mode of adhering the vulcanized rubber component to the unvulcanized rubber component.

Ethylene-α-Olefin Copolymer

The ethylene-α-olefin copolymer contained in the rubber composition of the rubber to be adhered is not particularly limited. Examples of α-olefin constituting the ethylene-α-olefin copolymer include ethylene, propylene, 1-butene, 1-pentene, 1-hexene, 1-heptene, and 1-octene.

Specific examples of the ethylene-α-olefin copolymer include an ethylene-propylene copolymer (EPM), an ethylene-1-butene copolymer (EBM), an ethylene-1-hexene copolymer, an ethylene-1-octene copolymer, and an ethylene-4-methyl-pentene-1 copolymer. One type of the ethylene-α-olefin copolymer may be used alone, or two or more types thereof may be used in combination.

Organic Peroxide (X1)

The organic peroxide (X1) contained in the rubber composition of the rubber to be adhered is not particularly limited, and a conventionally known one may be used.

Specific examples of the organic peroxide (X1) include dicumyl peroxide, di-t-butyl peroxide, 1,3-bis(t-butylperoxyisopropyl)benzene, n-butyl 4,4'-di(t-butylperoxy)valerate, and 2,5-dimethyl-2,5-bis(t-butylperoxy)hexane. One type of the organic peroxide may be used alone, or two or more types thereof may be used in combination.

As the organic peroxide (X1), a commercially available product can be used. Specific examples thereof include 1,3-bis(t-butylperoxyisopropyl)benzene (trade name "Perkadox 14-40," available from Kayaku Akzo Corporation).

In the present technology, it is preferable that the content of the organic peroxide (X1) be from 0.011 to 0.020 molar equivalents, preferably from 0.013 to 0.018 molar equivalents, and more preferably from 0.014 to 0.017 molar equivalents, relative to the ethylene-α-olefin copolymer in the rubber to be adhered.

It is preferable that the content of the organic peroxide (X1) fall within the above-described range of the molar equivalent and the content ratio (X2/X1) of the organic peroxide (X2) described below to the organic peroxide (X1) ranges from 1.20 to 2.00, and preferably ranges from 1.35 to 1.70.

Carbon Black (Y1)

The carbon black (Y1) contained in the rubber composition of the rubber to be adhered is not particularly limited, and a conventionally known one may be used.

Specific examples of the carbon black (Y1) include furnace carbon black such as SAF, ISAF, HAF, FEF, GPF, and SRF. One type of the carbon black may be used alone, or two or more types thereof may be used in combination.

It is preferable that the content of the carbon black (Y1) be from 40 to 60 parts by mass, and more preferably from 45 to 55 parts by mass, relative to 100 parts by mass of the ethylene-α-olefin copolymer.

It is preferable that the content of the carbon black (Y1) fall within the above-described range of the content expressed in parts by mass and the difference in the content (Y1-Y2) between the carbon black (Y1) and carbon black (Y2) described below ranges from 0 to 10 parts by mass, and preferably ranges from 5 to 10 parts by mass.

In addition to the components described above, the rubber composition of the rubber to be adhered in the present technology may contain ingredients such as a filler other than carbon black (e.g., silica), an anti-aging agent, an antioxidant, a pigment (dye), a plasticizer, a softening agent, a flame retardant, a vulcanization accelerator, a wax, an antistatic agent, and a processing aid, if necessary.

In the present technology, the rubber composition of the rubber to be adhered can be prepared by kneading each component described above with a Banbury mixer or the like.

An unvulcanized rubber component that is the rubber to be adhered may be the very rubber composition of the rubber to be adhered.

A vulcanized rubber component that is the rubber to be adhered can be obtained by vulcanizing the rubber composition of the rubber to be adhered, for example, under conditions including a temperature of about 140 to 150° C. and 0.5 hours.

Rubber for Adhesion

In the present technology, the rubber for adhesion is not particularly limited as long as it includes the rubber composition containing the ethylene-α-olefin copolymer, the organic peroxide (X2), and the carbon black (Y2). The rubber for adhesion may be an unvulcanized rubber composition or a vulcanized rubber composition, and is preferably an unvulcanized rubber composition.

Specific examples of the ethylene-α-olefin copolymer, the organic peroxide (X2), and the carbon black (Y2) in the rubber composition of such a rubber for adhesion include those exemplified by the ethylene-α-olefin copolymer, the organic peroxide (X1), and the carbon black (Y1) in the above-described rubber composition of the rubber to be adhered.

Content of Organic Peroxide (X2)

In the present technology, it is preferable that the content of the organic peroxide (X2) be from 0.017 to 0.022 molar equivalents, preferably from 0.018 to 0.021 molar equivalents, and more preferably from 0.019 to 0.020 molar equivalents, relative to the ethylene-α-olefin copolymer in the rubber for adhesion.

Content of Carbon Black (Y2)

In the present technology, it is preferable that the content of the carbon black (Y2) be from 30 to 50 parts by mass, and more preferably from 35 to 45 parts by mass, relative to 100 parts by mass of the ethylene-α-olefin copolymer.

In addition to the components described above, the rubber composition of the rubber for adhesion in the present technology may contain ingredients such as a filler other than carbon black (e.g., silica), an anti-aging agent, an antioxidant, a pigment (dye), a plasticizer, a softening agent, a flame retardant, a vulcanization accelerator, a wax, an antistatic agent, and a processing aid, if necessary, like the rubber composition of the rubber to be adhered.

In the present technology, the rubber composition of the rubber for adhesion can be prepared by kneading each component described above with a Banbury mixer or the like, like the rubber composition of the rubber to be adhered.

Adhesion Mode

The method of adhering of the present technology is a method in which the above-described rubbers to be adhered are adhered using the above-described rubber for adhesion at an adhesive interface.

Herein "using at the adhesive interface" includes a mode in which the rubber for adhesion is disposed at the adhesive interface between the rubbers to be adhered, a mode in which a solution obtained by dissolving the rubber for adhesion is applied at the adhesive interface between the rubbers to be adhered, and the like.

Suitable examples of the adhesion method include, but are not particularly limited to, a method in which the rubber for adhesion is disposed at the adhesive interface between the rubbers to be adhered and they are pressed under heating. A condition of pressing under heating is not particularly limited since the condition is varied depending on the type of the ethylene-α-olefin copolymer and the type of the organic peroxide. For example, when an ethylene-propylene copolymer (EPM) is used as the ethylene-α-olefin copolymer and 1,3-bis(t-butylperoxyisopropyl)benzene is used as the organic peroxide, a condition of pressing at about 1 MPa under heating at from 140 to 160° C. for from 30 minutes to 2 hours is preferred.

The method of adhering of the present technology can facilitate an endless processing for rubber products (especially, in an elongated form). Therefore, the method of adhering is preferably used in bonding together rubber products having excellent heat resistance such as conveyor belts.

The conveyor belt of the present technology is a conveyor belt obtained by adhesion through the method of adhering of the present technology. Specifically, the conveyor belt can be obtained by overlapping an end of a conveyor belt and an end of another conveyor belt, disposing the rubber for adhesion at an interface where the ends are overlapped, and pressing the ends under heating.

Examples

Hereinafter, the method of adhering of the present technology will be further described in detail with reference to examples; however, the present technology is not limited thereto.

Preparation of Rubber Compositions 1 to 8

Each rubber composition was prepared using composition components shown in Table 1 below in amounts (part by mass) (molar equivalent for an organic peroxide) relative to 100 parts by mass of a rubber composition including an ethylene-propylene copolymer (EPM) and if desired, an ethylene-1-butene copolymer (EBM).

Specifically, a master batch was obtained by first kneading the components shown in Table 1 below, except for a crosslinking agent and an organic peroxide, for 5 minutes in a (3.4-L) Banbury mixer, and then discharging the kneaded product when the temperature reached 160° C. A rubber composition was obtained by kneading the obtained master batch with the crosslinking agent and the organic peroxide with an open roll.

TABLE 1

|  | Composition 1 | Composition 2 | Composition 3 |
|---|---|---|---|
| EPM | 100 | 70 | 70 |
| EBM |  | 30 | 30 |
| Carbon black | 50 | 50 | 50 |
| Zinc oxide | 5 | 5 | 5 |
| Stearic acid | 1 | 1 | 1 |
| Anti-aging agent | 8 | 8 | 8 |
| Crosslinking agent | 3 | 3 | 3 |
| Plasticizer | 15 | 15 | 15 |
| Organic peroxide (molar equivalent) | 0.013 | 0.013 | 0.018 |

TABLE 1

|  | Composition 4 | Composition 5 | Composition 6 |
|---|---|---|---|
| EPM | 70 | 70 | 100 |
| EBM | 30 | 30 |  |
| Carbon black | 50 | 40 | 40 |
| Zinc oxide | 5 | 5 | 5 |
| Stearic acid | 1 | 1 | 1 |
| Anti-aging agent | 8 | 8 | 8 |
| Crosslinking agent | 3 | 3 | 3 |
| Plasticizer | 15 | 15 | 15 |
| Organic peroxide (molar equivalent) | 0.020 | 0.018 | 0.018 |

TABLE 1

|  | Composition 7 | Composition 8 |
|---|---|---|
| EPM | 100 | 100 |
| EBM |  |  |
| Carbon black | 40 | 40 |
| Zinc oxide | 5 | 5 |
| Stearic acid | 1 | 1 |
| Anti-aging agent | 8 | 8 |
| Crosslinking agent | 3 | 3 |
| Plasticizer | 15 | 15 |
| Organic peroxide (molar equivalent) | 0.020 | 0.022 |

Details of the components listed in Table 1 are as follows.
EPM: ethylene-propylene copolymer (KEP-110, manufactured by KUMHO POLYCHEM)
EBM: ethylene-1-butene copolymer (Engage 7487, manufactured by Dow Chemicals)
Carbon black: Niteron #300 (manufactured by NSCC Carbon Co., Ltd.)
Zinc oxide: Zinc Oxide #3 (manufactured by Seido Chemical Industry Co., Ltd.)
Stearic acid: stearic acid 50S (manufactured by Chiba Fatty Acid Co., Ltd.)
Anti-aging agent: NOCRAC MMB (manufactured by Ouchi Shinko Chemical Industrial Co., Ltd.)
Crosslinking agent: magnesium dimethacrylate (Hi-Cross GT, manufactured by Seiko Chemical Co., Ltd.)
Plasticizer: Lucant HC-3000X (manufactured by Mitsui Chemicals, Inc.)
Organic peroxide: 1,3-bis(t-butylperoxyisopropyl)benzene (Perkadox 14-40, manufactured by Kayaku Akzo Corporation) Working Examples 1 to 5 and Comparative Examples 1 to 5

Using each of the compositions 1 to 8 shown in Table 1, a rubber to be adhered and an unvulcanized rubber for adhesion were adhered.

Specifically, the rubber to be adhered including a rubber composition shown in Table 2 below (having a thickness of 5 mm) was bonded to the rubber for adhesion including a rubber composition shown in Table 2 below (having a thickness of 5 mm), followed by pressing under heating at 150° C. for 60 minutes. A sample shape was produced in accordance with "Peel strength to cloth" of JIS (Japanese Industrial Standard) K6256-1:2006.

The contents of organic peroxides and carbon blacks in the rubber to be adhered and the rubber for adhesion and the ratios thereof are also shown in Table 2 below.

After the adhesion, a peel force was measured by a method shown below and the adhesion properties were evaluated. The results are shown in Table 2 below.

Peel Force

A peel force (N/mm) was measured via a peeling test under conditions of room temperature (23° C.) and 150° C. in accordance with "peel strength to cloth" of JIS K6256-1:2006.

TABLE 2

|  | Comparative Example | | |
|---|---|---|---|
|  | 1 | 2 | 3 |
| Rubber to be adhered | Composition 1 | Composition 2 | Composition 2 |
| Molar equivalent of organic peroxide: X1 | 0.013 | 0.013 | 0.013 |
| Content of carbon black: Y1 | 50 | 50 | 50 |
| Rubber for adhesion | Composition 1 | Composition 2 | Composition 1 |
| Molar equivalent of organic peroxide: X2 | 0.013 | 0.013 | 0.013 |
| Content of carbon black: Y2 | 50 | 50 | 50 |
| Content ratio of organic peroxides (X2/X1) | 1.00 | 1.00 | 1.00 |
| Difference in content between carbon blacks (Y1-Y2) | 0 | 0 | 0 |
| Peel force (room temperature) (N/mm) | 6.3 | 10.7 | 16.4 |
| Peel force (150° C.) (N/mm) | 1.2 | 1.5 | 2.2 |

TABLE 2

|  | Comparative Example | |
|---|---|---|
|  | 4 | 5 |
| Rubber to be adhered | Composition 3 | Composition 4 |
| Molar equivalent of organic peroxide: X1 | 0.018 | 0.020 |
| Content of carbon black: Y1 | 50 | 50 |
| Rubber for adhesion | Composition 3 | Composition 4 |
| Molar equivalent of organic peroxide: X2 | 0.018 | 0.020 |
| Content of carbon black: Y2 | 50 | 50 |
| Content ratio of organic peroxides (X2/X1) | 1.00 | 1.00 |
| Difference in content between carbon blacks (Y1-Y2) | 0 | 0 |
| Peel force (room temperature) (N/mm) | 10.2 | 9.8 |
| Peel force (150° C.) (N/mm) | 4.2 | 7.2 |

TABLE 2

|  | Working Example | | |
|---|---|---|---|
|  | 1 | 2 | 3 |
| Rubber to be adhered | Composition 2 | Composition 2 | Composition 2 |
| Molar equivalent of organic peroxide: X1 | 0.013 | 0.013 | 0.013 |
| Content of carbon black: Y1 | 50 | 50 | 50 |
| Rubber for adhesion | Composition 4 | Composition 5 | Composition 6 |
| Molar equivalent of organic peroxide: X2 | 0.020 | 0.018 | 0.018 |
| Content of carbon black: Y2 | 50 | 40 | 40 |

TABLE 2-continued

| | Working Example | | |
|---|---|---|---|
| | 1 | 2 | 3 |
| Content ratio of organic peroxides (X2/X1) | 1.54 | 1.38 | 1.38 |
| Difference in content between carbon blacks (Y1-Y2) | 0 | 10 | 10 |
| Peel force (room temperature) (N/mm) | 11.8 | 11.0 | 11.6 |
| Peel force (150° C.) (N/mm) | 6.2 | 7.7 | 5.8 |

TABLE 2

| | Working Example | |
|---|---|---|
| | 4 | 5 |
| Rubber to be adhered | Composition 2 | Composition 2 |
| Molar equivalent of organic peroxide: X1 | 0.013 | 0.013 |
| Content of carbon black: Y1 | 50 | 50 |
| Rubber for adhesion | Composition 7 | Composition 8 |
| Molar equivalent of organic peroxide: X2 | 0.020 | 0.022 |
| Content of carbon black: Y2 | 40 | 40 |
| Content ratio of organic peroxides (X2/X1) | 1.54 | 1.69 |
| Difference in content between carbon blacks (Y1-Y2) | 10 | 10 |
| Peel force (room temperature) (N/mm) | 14.5 | 18.2 |
| Peel force (150° C.) (N/mm) | 6.8 | 6.8 |

As seen from the results shown in Table 2, when the content of the organic peroxide (X1) in the rubber to be adhered is from 0.011 to 0.020 molar equivalents, the content of the organic peroxide (X2) in the rubber for adhesion is from 0.017 to 0.022 molar equivalents, and the content ratio (X2/X1) of the organic peroxide (X2) to the organic peroxide (X1) is less than 1.20, the peel force at room temperature and 150° C. is decreased, and the adhesion properties between rubber products are deteriorated (Comparative Examples 1 to 5).

In contrast, when the content of the organic peroxide (X1) in the rubber to be adhered is from 0.011 to 0.020 molar equivalents, the content of the organic peroxide (X2) in the rubber for adhesion is from 0.017 to 0.022 molar equivalents, and the content ratio (X2/X1) of the organic peroxide (X2) to the organic peroxide (X1) is from 1.20 to 2.00, the peel force at room temperature and 150° C. is increased, and the adhesion properties between rubber products are improved (Working Examples 1 to 5).

The invention claimed is:

1. A conveyor belt obtained by bonding together conveyor belts to be adhered using an adhesive rubber, wherein
   the conveyor belts to be adhered include a rubber composition containing an ethylene-α-olefin copolymer, an organic peroxide (X1), and carbon black (Y1), the organic peroxide (X1) being contained in an amount of from 0.011 to 0.020 molar equivalents relative to the ethylene-α-olefin copolymer in the conveyor belts to be adhered,
   the adhesive rubber includes a rubber composition containing an ethylene-α-olefin copolymer, an organic peroxide (X2), and carbon black (Y2), the organic peroxide (X2) being contained in an amount of from 0.017 to 0.022 molar equivalents relative to the ethylene-α-olefin copolymer in the adhesive rubber, and
   a content ratio (X2/X1) of the organic peroxide (X2) to the organic peroxide (X1) is from 1.20 to 2.00.

2. The conveyor belt according to claim 1, wherein a content of the carbon black (Y1) in the conveyor belts to be adhered is from 40 to 60 parts by mass relative to 100 parts by mass of the ethylene-α-olefin copolymer in the conveyor belts to be adhered,
   a content of the carbon black (Y2) in the adhesive rubber is from 30 to 50 parts by mass relative to 100 parts by mass of the ethylene-α-olefin copolymer in the adhesive rubber, and
   a difference (Y1-Y2) in the content between the carbon black (Y1) and the carbon black (Y2) is from 0 to 10 parts by mass.

* * * * *